(12) United States Patent
Sasaki et al.

(10) Patent No.: US 6,262,824 B1
(45) Date of Patent: Jul. 17, 2001

(54) INFORMATION APPARATUS HAVING INFRARED COMMUNICATION DEVICE FOR TRANSMITTING/RECEIVING DATA

(75) Inventors: Katsumaru Sasaki; Naohiro Yokoyama; Yasuyuki Suzuki, all of Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/050,377

(22) Filed: Mar. 31, 1998

(30) Foreign Application Priority Data

Apr. 22, 1997 (JP) .................................................... 9-104745

(51) Int. Cl.[7] .................................................... H04B 10/00
(52) U.S. Cl. .......................... 359/163; 359/152; 359/153; 359/159; 359/172; 361/681; 361/683; 345/156
(58) Field of Search .................................. 359/172, 159, 359/163, 152, 153; 361/681, 683; 345/156

(56) References Cited

U.S. PATENT DOCUMENTS

| 5,247,285 | | 9/1993 | Yokota et al. . | |
|---|---|---|---|---|
| 5,440,449 | | 8/1995 | Scheer . | |
| 5,574,477 | * | 11/1996 | Shimizu et al. | 345/102 |
| 5,668,695 | * | 9/1997 | Nakamura et al. | 361/683 |
| 5,757,354 | * | 5/1998 | Kawamura | 345/126 |
| 5,781,321 | * | 7/1998 | Kobayashi | 359/143 |
| 5,781,405 | * | 7/1998 | Vossler | 361/686 |
| 5,781,407 | * | 7/1998 | Brauel | 361/683 |
| 5,812,371 | * | 9/1998 | Chen et al. | 361/686 |
| 5,844,774 | * | 12/1998 | Gushiken et al. | 361/681 |
| 5,877,745 | * | 3/1999 | Beeteson et al. | 345/156 |
| 5,889,602 | * | 3/1999 | Johnson et al. | 359/154 |
| 5,903,374 | * | 5/1999 | Kobayashi | 359/159 |
| 5,905,550 | * | 5/1999 | Ohgami et al. | 349/58 |
| 5,949,565 | * | 9/1999 | Ishida | 359/154 |
| 6,023,254 | * | 2/2000 | Johnson et al. | 345/32 |
| 6,125,029 | * | 9/2000 | Sasaki et al. | 361/681 |
| 6,191,938 | * | 2/2001 | Ohgami et al. | 361/681 |

FOREIGN PATENT DOCUMENTS

| 5257585 | * | 10/1993 | (JP) . |
|---|---|---|---|
| 5-257585 | | 10/1993 | (JP) . |
| 8-129433 | | 5/1996 | (JP) . |
| 3028181 | | 6/1996 | (JP) . |

* cited by examiner

*Primary Examiner*—Leslie Pascal
*Assistant Examiner*—Hanh Phan
(74) *Attorney, Agent, or Firm*—Finnegan, Henderson, Farabow, Garrett & Dunner, L.L.P.

(57) ABSTRACT

An information apparatus such as a portable computer comprises a main body having an upper surface, and a display unit. The display unit includes a display housing having a front surface and a rear surface located opposite to the front surface, and a display contained in the display housing and having a display screen exposed to the front surface. The display unit is supported on the main body to be rotatable between a closed position where the display unit falls down to cover the upper surface and an open position where the display unit stands up to expose the upper surface. An optical communication device for transmitting/receiving data by using infrared is contained within the display housing. The communication device has a communication port exposed to the rear surface of the display housing.

3 Claims, 6 Drawing Sheets

US 6,262,824 B1

INFORMATION APPARATUS HAVING INFRARED COMMUNICATION DEVICE FOR TRANSMITTING/RECEIVING DATA

BACKGROUND OF THE INVENTION

The present invention relates to an information apparatus having an optical communication function for transmitting/receiving data by using light such as infrared.

There is known a so-called "book-type" or "notebook-type" compact portable computer capable of exchanging data with an information device or a peripheral device by means of infrared. This type of portable computer comprises a main body and a display unit rotatably supported on the main body. The main body includes a box-shaped housing body on which a keyboard is disposed. An infrared communication device for transmitting/receiving data by using infrared is contained within the housing body.

The infrared communication device includes a light emission element for emitting infrared, and a light reception element for receiving infrared. The light emission element and light reception element are juxtaposed in the width direction of the housing body. The housing body has a communication port in its rear surface. The communication port faces the light emission element and light reception element. The communication port is covered with a light-transmissive protection cover. According to the conventional portable computer, if the communication port provided in the rear surface of the housing body is opposed to a communication port provided in some other information device, data can be exchanged between the portable computer and the information device.

In the conventional portable computer, the communication port is positioned at the rear surface of the housing body and the position of this communication port is fixed. In a case where the positions of the communication ports of the portable computer and the associated information device, between which data is to be exchanged, are vertically displaced from each other, it is necessary to vertically move either the portable computer or the information device so that both communication ports may exactly be aligned with each other.

Since infrared has high linear propagation properties (i.e. directivity), communication failures or communication abnormalities will occur frequency if the work for aligning the communication ports is not, or not exactly, performed. Thus, the work for aligning the communication ports must be performed with high precision, and a great deal of time and labor is needed until infrared communication is started.

BRIEF SUMMARY OF THE INVENTION

The present invention has been made in consideration of the above circumstances, and its object is to provide an information apparatus wherein the vertical position of optical communication means can be freely adjusted, and data exchange between the apparatus and some other device can be performed easily and exactly with enhanced reliability of optical communication.

In order to achieve the object, there is provided an information apparatus comprising:
 a main body having an upper surface;
 a display unit including a display housing having a front surface and a rear surface located opposite to the front surface, and a display contained in the display housing and having a display screen exposed to the front surface, the display unit being supported on the main body to be rotatable between a closed position where the display unit falls down to cover the upper surface and an open position where the display unit stands up to expose the upper surface; and
 optical communication means for transmitting/receiving data by using light, the optical communication means being contained within the display housing and having a communication port exposed to the rear surface of the display housing.

According to the present invention, there is also provided an information apparatus comprising:
 a main body having an upper surface on which a keyboard is disposed;
 a display unit including a display housing having a front surface and a rear surface located opposite to the front surface, and a display contained in the display housing and having a display screen exposed to the front surface, the display unit being supported on the main body to be rotatable between a closed position where the display unit falls down to cover the keyboard and an open position where the display unit stands up to expose the keyboard;
 optical communication means for transmitting/receiving data by using light, the optical communication means being contained within the display housing and having a communication port exposed to the rear surface of the display housing; and
 a plurality of icons for displaying operational states of the apparatus, the icons being disposed on the front surface of the display housing in a back-to-back positional relationship with the optical communication means.

In the above structure, the optical communication means is provided in the display unit which is rotatable over an angular range between an open position and a closed position. At the time of starting communication, the display unit is rotated to the open position. If the display unit situated in the open position is rotated to vary the angle of its standing position, the communication port for receiving/transmitting light from/to some other device moves while describing a locus arcuated upward from the main body.

As a result, the vertical position of the communication port can be adjusted along the height of the apparatus by a simple operation of rotating the display unit, and the range of light reception/transmission can be widened. Even when the vertical positions of the apparatus and device, between which communication is to be performed, are displaced from each other, there is no need to perform such a time-consuming work as raising the apparatus, and communication can be performed easily. In addition, the possibility of communication failure or communication abnormality decreases, and the reliability of data exchange by means of infrared increases.

In order to achieve the above-described object, the present invention also provides an information apparatus comprising:
 a main body having an upper surface on which information input means is disposed;
 a display unit including a display housing having a front surface and a rear surface located opposite to the front surface, and a display contained in the display housing and having a display screen exposed to the front surface, the display unit being supported on the main body to be rotatable between a closed position where the display unit falls down to cover the information input means and an open position where the display unit stands up to expose the information input means; and optical communication means for transmitting/receiving data by using infrared, the optical communication means having a light emission element and a light reception element and contained within the display housing, wherein the rear surface of the display housing has an opening opposed to the light emission element and the light reception element, the opening being covered with a light-permissible protection cover.

In the above structure, the optical communication means is provided in the display unit which is rotatable over an angular range between an open position and a closed position. At the time of starting communication, the display unit is rotated to the open position. If the display unit situated in the open position is rotated to vary the angle of its standing position, the opening for receiving/transmitting light from/to some other device moves while describing a locus arcuated upward from the main body. Thus, the vertical position of the opening can be adjusted along the height of the apparatus by a simple operation of rotating the display unit, and the range of light reception/transmission can be widened. Even when the vertical positions of the apparatus and device, between which communication is to be performed, are displaced from each other, there is no need to perform such a time-consuming work as raising the apparatus, and communication can be performed easily. In addition, the possibility of communication failure or communication abnormality decreases, and the reliability of data exchange by means of infrared increases.

In order to achieve the object, this invention also provides an information apparatus comprising:

a main body having an upper surface on which a keyboard is disposed;

a display unit including a display housing having a front surface and a rear surface located opposite to the front surface, and a display contained in the display housing and having a display screen exposed to the front surface, the display unit being supported on the main body to be rotatable between a closed position where the display unit falls down to cover the keyboard and an open position where the display unit stands up to expose the keyboard;

a circuit board contained within the display housing, the circuit board having a first surface opposed to the rear surface of the display housing and a second surface opposed to the front surface of the display housing;

optical communication means for transmitting/receiving data by using light, the optical communication means being disposed on the first surface of the circuit board and having a communication port exposed to the rear surface of the display housing; and functional components disposed on the second surface of the circuit board and opposed to the front surface of the display housing.

In the above structure, the optical communication means is provided in the display unit which is rotatable over an angular range between an open position and a closed position. At the time of starting communication, the display unit is rotated to the open position. If the display unit situated in the open position is rotated to vary the angle of its standing position, the communication port for receiving/transmitting light from/to some other device moves while describing a locus arcuated upward from the main body. Thus, the vertical position of the communication port can be adjusted along the height of the apparatus by a simple operation of rotating the display unit, and the range of light reception/ transmission can be widened. Even when the vertical positions of the apparatus and device, between which communication is to be performed, are displaced from each other, there is no need to perform such a time-consuming work as raising the apparatus, and communication can be performed easily. In addition, the possibility of communication failure or communication abnormality decreases, and the reliability of data exchange by means of infrared increases.

Moreover, according to the above structure, the optical communication means and functional components can be supported on a common circuit board in a back-to-back arrangement. Thus, compared to the case where the optical communication means and functional components are supported on different circuit boards, the number of parts can be reduced. Therefore, the optical communication means and functional components can be contained within the display housing with no difficulty.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention, which is applied to a portable computer, will now be described with reference to the accompanying drawings.

Figure 1:
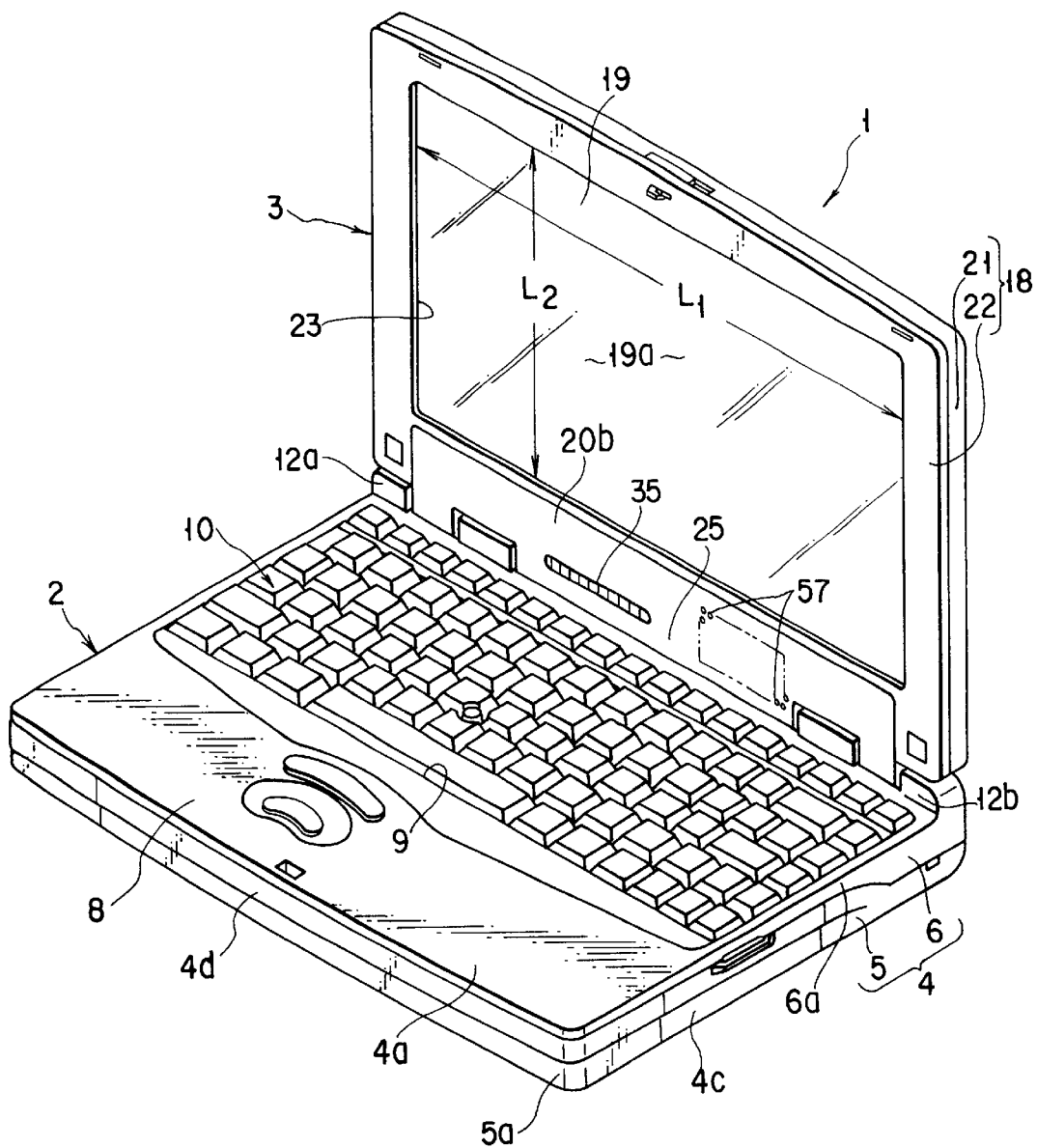
FIG. 1 is a perspective view of a portable computer according to an embodiment of the present invention.
Figure 2:
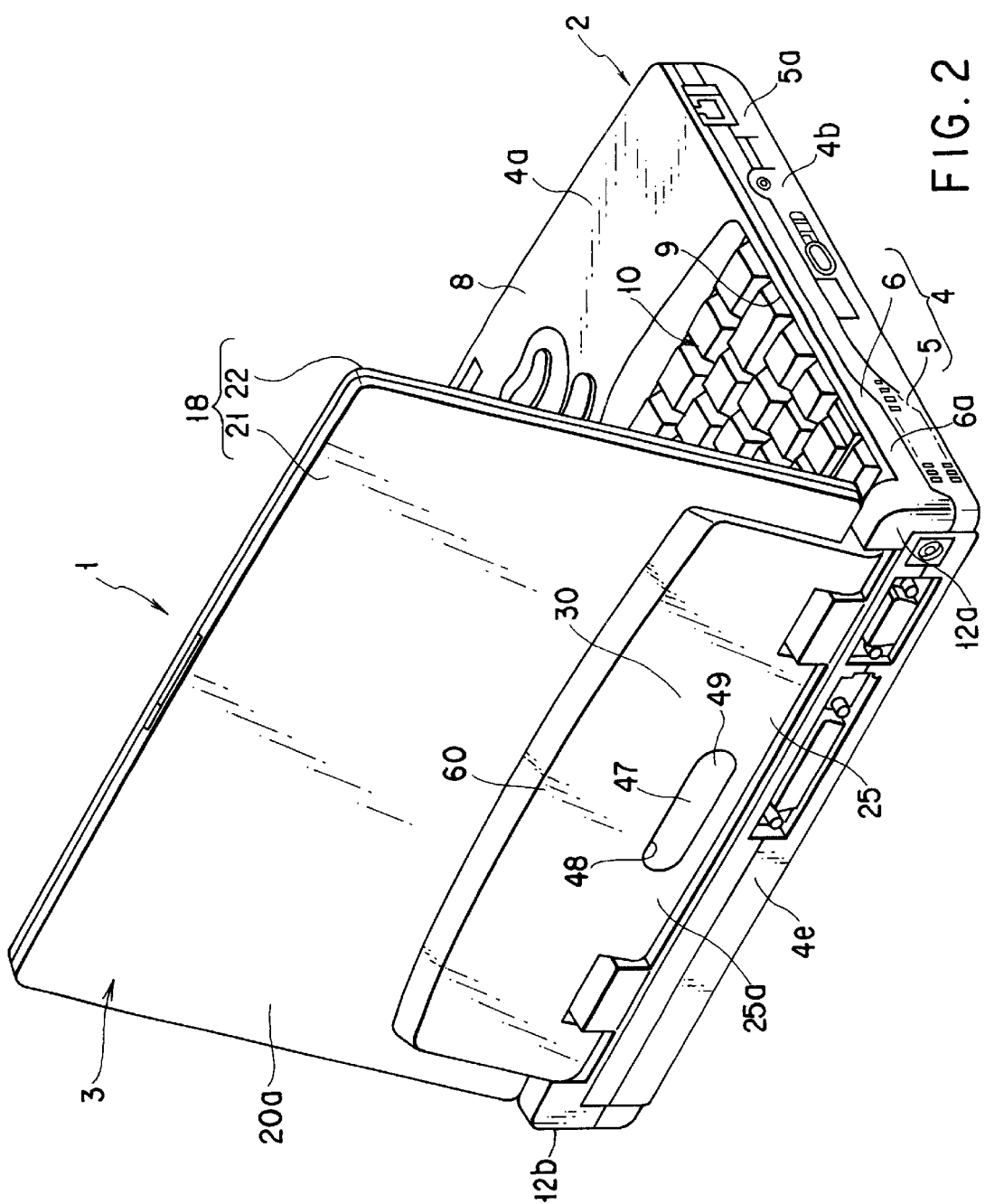
FIG. 2 is a perspective view of the portable computer in a state in which a display unit is rotated in an open position to situate a communication port in an upright position.

FIGS. 1 and 2 show a book-type portable computer 1. The portable computer 1 comprises a main body 2 and a display unit 3 supported on the main body 2.

The main body 2 has a housing body 4 formed of a synthetic resin. The housing body 4 has a flat box shape and includes a top wall 4a, a left side wall 4b, a right side wall 4c, a front wall 4d, a rear wall 4e, and a bottom wall (not shown). The housing body 4 comprises a lower housing 5 and an upper housing 6. The lower housing 5 includes the aforementioned bottom wall and a peripheral wall 5a extending upward from a peripheral edge of the bottom wall. The upper housing 6 includes the aforementioned top wall 4a and a peripheral wall 6a extending downward from a peripheral edge of the top wall 4a. The peripheral wall 5a of lower housing 5 and the peripheral wall 6a of upper housing 6 cooperate to constitute the side walls 4b and 4c, front wall 4d and rear wall 4e of the housing body 4.

The top wall 4a or the upper surface of housing body 4 has a palm rest 8 and a keyboard mount portion 9. The palm rest 8 is located on a front end part of the housing body 4. The keyboard mount portion 9 is located behind the palm rest 8. A keyboard 10 functioning as input means is mounted in the keyboard mount portion 9.

As is shown in FIGS. 1 and 2, first and second projecting portions 12a and 12b are formed at a rear end portion of the top wall 4a of housing body 4. The first and second projecting portions 12a and 12b are spaced apart in the width direction of the housing body 4. Each of the first and second projecting portions 12a and 12b has a hollow shape and communicates with the inside of the housing body 4.

A main circuit board 14 (shown in FIG. 5) is provided within the housing body 4. The circuit board 14 is supported on the bottom wall of lower housing 5. Various circuit components 15 such as a DRAM are mounted on the circuit board 14.

The display unit 3, as shown in FIGS. 1 to 4, comprises a display housing 18 of a synthetic resin and a liquid crystal display (LCD) 19 mounted within the display housing 18. The display housing 18 has a flat box shape and includes a rear surface 20a and a front surface 20b. The display housing 18 comprises a display cover 21 and a display mask 22 detachably coupled to the display cover 21. The display cover 21 has the aforementioned rear surface 20a. The display mask 22 has the front surface 20b in which a rectangular display window 23 is opened.

The LCD 19 is screwed to the rear surface 20a of display cover 21. The LCD 19 has a display screen 19a for displaying information such as characters and figures. The display screen 19a is opposed to the display window 23 and exposed to the outside of the display housing 18 through the display window 23. The display screen 19a has a ratio of a horizontal dimension L1 to a vertical dimension L2, which is set at 16:9, as shown in FIG. 1. The display screen 19a is a so-called "wide-screen." Accordingly, the display window 23 of the display housing 18, too, has a long horizontal dimension which is about double the vertical dimension, and this dimensional ratio constitutes one of the features of the external appearance of the portable computer 1.

The display housing 18 has a support portion 25 projects from one end of the display housing 18 toward the rear end of the top wall 4a of housing 4. The support portion 25 extends in the width direction of the display housing 18. The support portion 25 has a first portion 25a continuous with the rear surface 20a and a second portion 25b continuous with the front surface 20b. The first and second portions 25a and 25b are opposed to each other.

Figure 5:
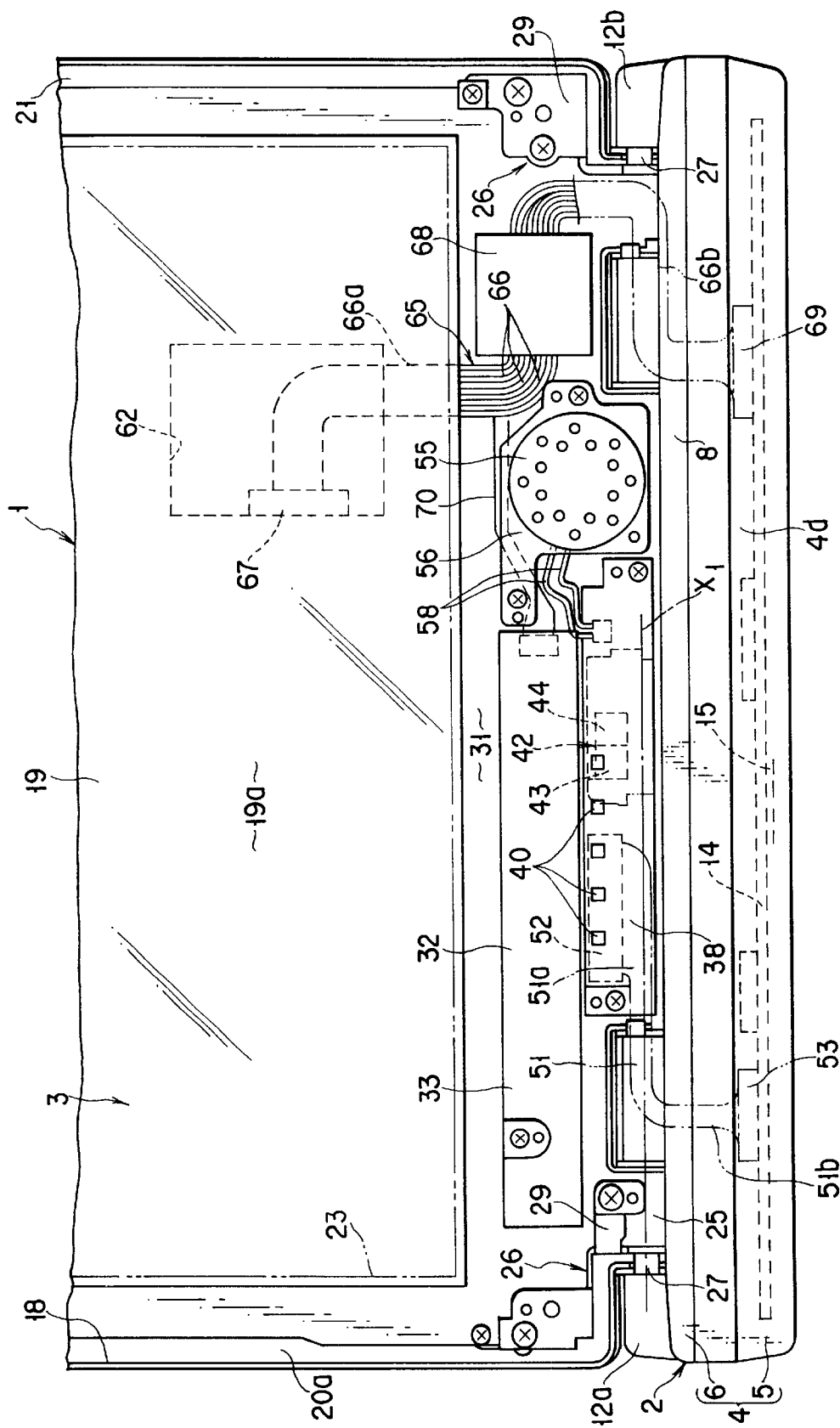
FIG. 5 is a front view of the portable computer, showing a state in which a display mask is removed from a display cover.
Figure 6:
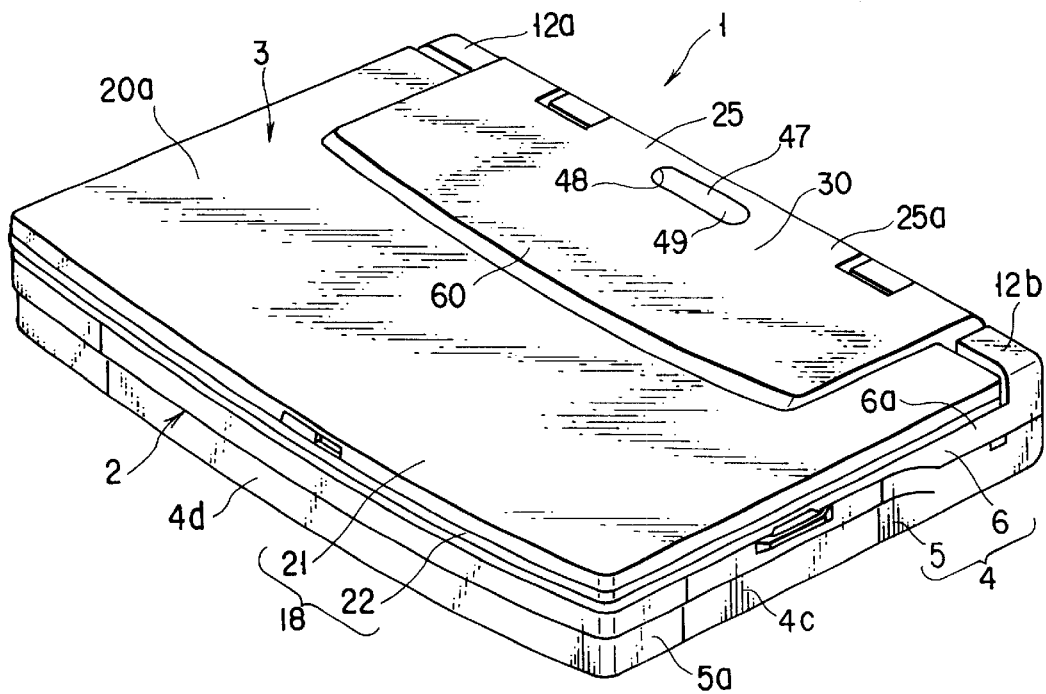
FIG. 6 is a perspective view of the portable computer, showing a state in which the display unit is rotated to its closed position.
Figure 7:
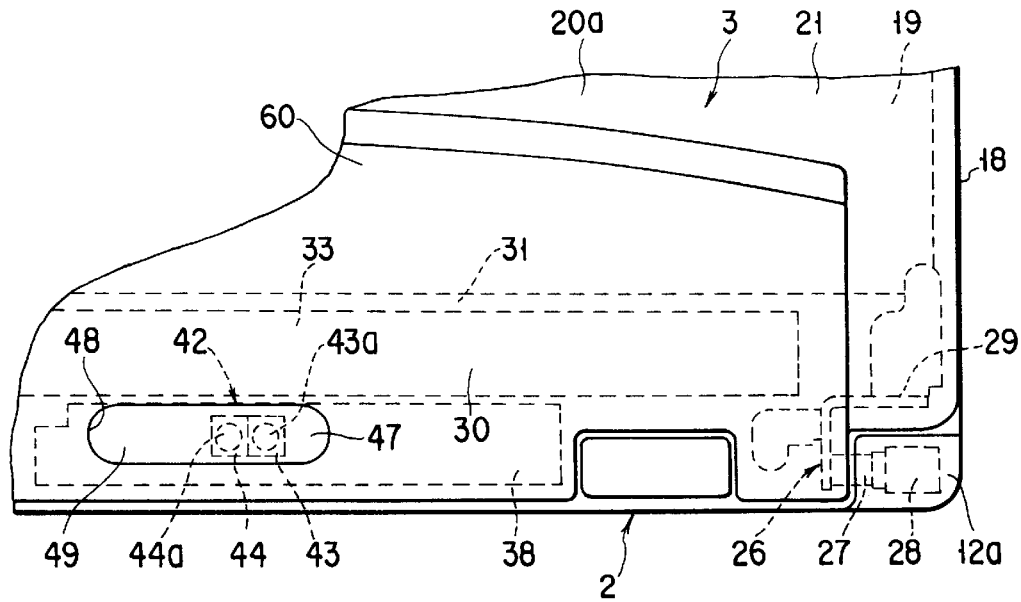
FIG. 7 is a plan view of the portable computer at the time the display unit is rotated to its closed position.

As is shown in FIGS. 5 and 7, the support portion 25 of display housing 18 is interposed between the first and second projecting portions 12a and 12b of housing body 4. The support portion 25 is supported on the housing body 4 by means of a pair of hinge devices 26. Each hinge device 26 has a hinge shaft 27 and first and second brackets 28 and 29. The hinge shafts 27 are situated horizontal along the width of the housing body 4. Each hinge shaft 27 has a first end portion and a second end portion. The first end portion of hinge shaft 27 is introduced into the first (second) projecting portion 12a (12b) through the side surface of the first (second) projecting portion 12a (12b). The second end portion of the hinge shaft 27 is introduced into the support portion 25 through the side surface of the support portion 25 of display housing 18.

The first bracket 28 is rotatably coupled to the first end portion of hinge shaft 27. The first bracket 28 is contained within the housing body 4 and screwed to the lower housing 5 of housing body 4. The second bracket 29 is fixed to the second end portion of hinge shaft 27. The second bracket 29 is contained within the support portion 25 and screwed to the display cover 21.

Figure 8:
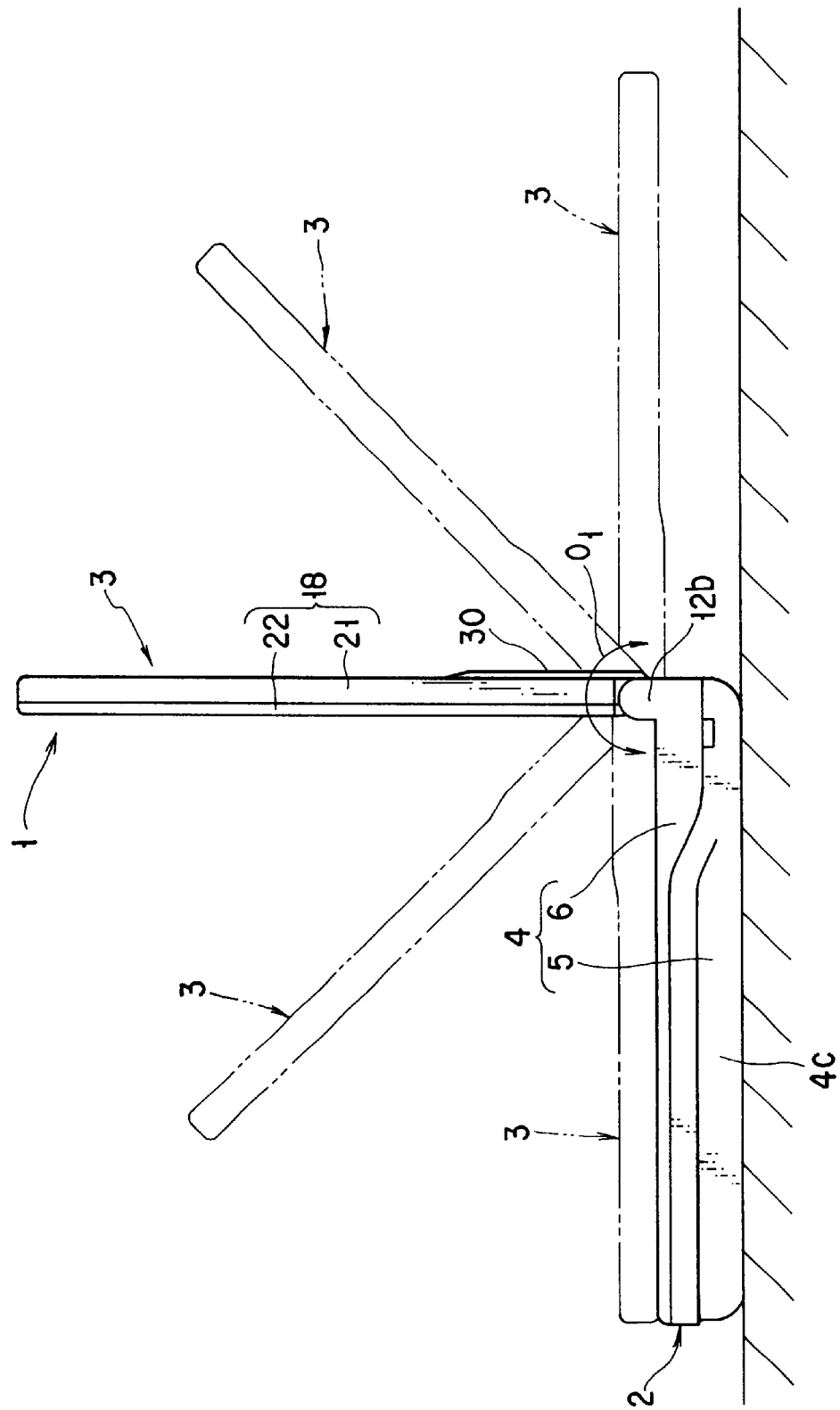
FIG. 8 is a side view of the portable computer, illustrating a range of rotation of the display unit.

The display unit 3 is thus rotatably supported on the housing body 4, with the hinge shafts 27 used as fulcra. Accordingly, as shown in FIG. 8, the display unit 3 can be rotated in the back-and-forth direction of the housing body over about 180° among three positions: a closed position where the display unit 3 falls to be substantially horizontal so as to cover the palm rest 8 and keyboard 10, an upright position where the palm rest 8 and keyboard 10 are exposed, and a fall-back position where the display unit 3 falls back to the rear side of the housing body 4 so as to be substantially horizontal.

Figure 3:
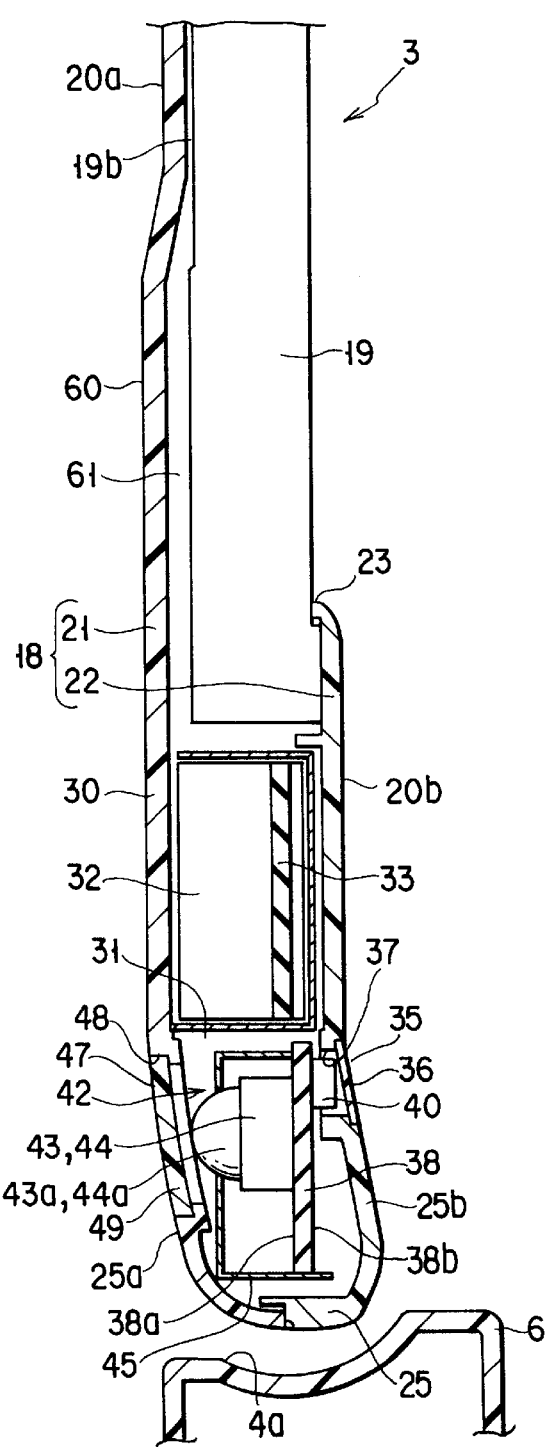
FIG. 3 is a cross-sectional view of the display unit, illustrating a positional relationship between a display housing and an infrared communication device.
Figure 4:
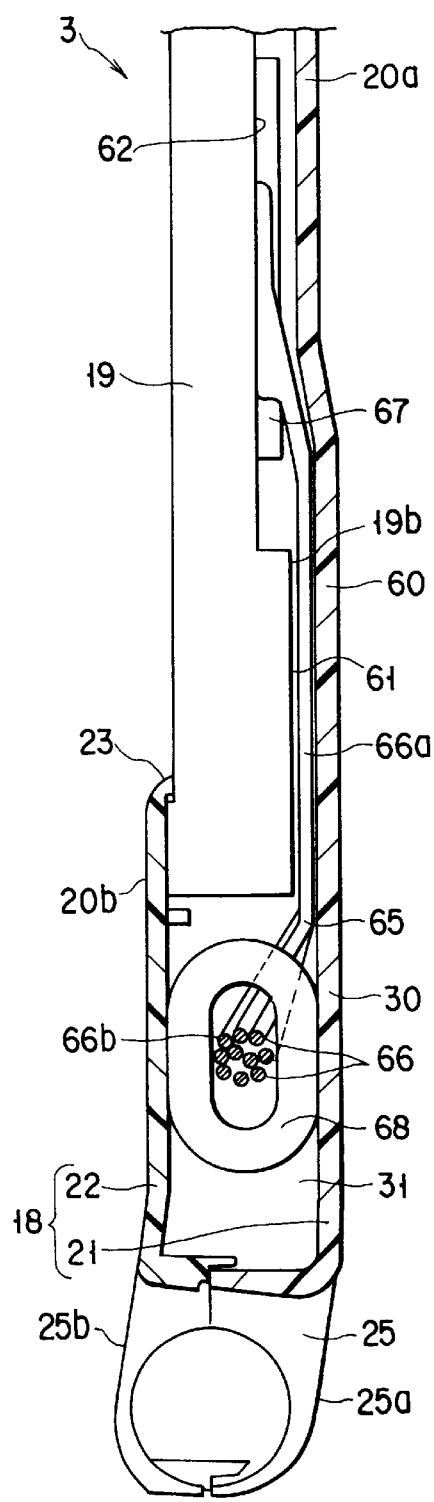
FIG. 4 is a cross-sectional view of the display unit, showing a wiring path of a cable communicating with an LCD.

As is shown in FIGS. 2 to 4, the rear surface 20a of display housing 18 has a projecting portion 30 projecting in a direction away from the front surface 20b. The projecting portion 30 extends in the width direction of the display housing 18 in a position shifting toward the support portion 25 of display housing 18. The projecting portion 30 is continuous with the first portion 25a of the support portion 25. The projecting portion 30 is opposed to the front surface 20b of display mask 22 and the second portion 25b of support portion 25. The projecting portion 30 cooperates with the front surface 20b and the second portion 25b to constitute a device containing chamber 31 within the display housing 18. The device containing chamber 31 is located below the LCD 19 when the display unit 3 is rotated to the open position.

As is shown in FIG. 5, the LCD 19 has a drive circuit section 32. The drive circuit section 32 is contained within the device containing chamber 31 and juxtaposed with the LCD 19. The drive circuit section 32 has a first circuit board 33 on which various circuit components (not shown) are mounted. The first circuit board 33 has an elongated plate shape, extending in the width direction of the display housing 18. The first circuit board 33 is screwed to the rear surface 20a of display housing 18.

As is shown in FIGS. 1 and 3, the display housing 18 has a plurality of icons 35 for displaying the operational states of the portable computer 1. The icons 35 are disposed on the front surface 20b of display housing 18. The icons 35 are linearly arranged at intervals in the width direction of the display housing 18. The icons 35 have an icon panel 36 for passing light. The icon panel 36 is mounted in an opening 37 formed in the front surface 20b.

A second circuit board 38 is contained within the device containing chamber 31. The second circuit board 38 has an elongated plate shape, extending in the direction of arrangement of icons 35. The second circuit board 38 is screwed to the first portion 25a of support portion 25 in a position away from the first circuit board 33 toward a distal end portion of the support portion 25. The second circuit board 38 has a first surface 38a facing the projecting portion 30 of display housing 18, and a second surface 38b facing the front surface 20b of display housing 18.

The second surface 38b of second circuit board 38 is opposed to the icon panel 36 through the opening 37. A plurality of light emitting diodes (LED) 40 are mounted as functional components on the second surface 38b. The LEDs 40 serve as light sources for the icons 35 and are disposed within the opening 37. Accordingly, if the LEDs 40 are turned on, the associated icons 35 are lit to display the operational states of the portable computer 1, for example, the on/off state of power, the character input mode, etc.

As is shown in FIGS. 3 and 5, an infrared communication device 42 constituting optical communication means is contained within the device containing chamber 33 of display housing 18. The infrared communication device 42 performs data communication between the portable computer, in which the infrared communication device 42 is provided, and another portable computer or a peripheral device such as a printer. The infrared communication device 42 comprises a light emission device 43 for emitting infrared, and a light reception device 44 for receiving infrared from some other device. The light emission element 43 and light reception element 44 are mounted on the first surface 38a of first circuit board 38 and arranged in the width direction of display housing 18. Accordingly, the infrared communication device 42 and the icons 35 are disposed in a back-to-back arrangement within the display housing 18, with the second circuit board 38 interposed therebetween.

The light emission device 43 and light reception element 44 have hemispheric lenses 43a and 44a, respectively. The lenses 43a and 44a are opposed to the projecting portion 30 of display cover 21. The light emission element 43 and light reception element 44 and the connection parts between these elements 43 and 44 and the second circuit board 38 are integrally covered with a metallic shield plate 45, except for the regions of lenses 43a and 44a.

As is shown in FIGS. 2, 3 and 7, the infrared communication device 42 has a communication port 47. The communication port 47 has an opening 48 formed in the projecting portion 30 of display cover 21, and a protection cover 49 for covering the opening 48. The opening 48 is located at a substantially middle portion in the width direction of the display cover 21, and is shifted toward a rotational axis X1 of the display unit 3 which passes through the center of the hinge shafts 27. The opening 48 has a shape elongated along the width of the display cover 21 and is opposed to the light emission element 43 and light reception element 44. The protection cover 49 is formed of a light-permissive synthetic resin material. The protection cover 49 is removably fitted in the opening 48 to cover the light emission element 43 and light reception element 44.

The light emission element 43 and light reception element 44, as shown in FIG. 5, are situated away from the rotational axis X1 of the display unit 3. Thus, if the display unit 3 is rotated from the closed position to the upright position to the fall-back position, the communication port 47 moves while describing a locus O1 arcuated upward of the housing body 4 about the hinge shaft 27. With this movement, the position of the infrared communication device 42 is vertically adjusted in the height direction of the portable computer 1.

As is shown in FIG. 5, the second circuit board 38 is electrically connected to the circuit board 14 over a cable 51. The cable 51 has a first end portion 51a introduced into the device containing chamber 31 of display housing 18, and a second end portion 51b introduced into the housing body 4. The first end portion 51a is electrically connected to the first surface 38a of the second circuit board 38 by means of a first cable connector 52. The second end portion 51b is electrically connected to the circuit board 14 by means of a second cable connector 53.

A disklike speaker 55 is disposed within the device containing chamber 31. The speaker 55 is screwed to the rear surface 20a of display cover 21 by means of a speaker bracket 56. A front surface of the speaker 55, from which sound is produced, faces the front surface 20b of display mask 22. The front surface 20b of display mask 22 has a number of through-holes 57 communicating with the front surface of the speaker 55. Accordingly, the sound produced from the speaker 55 is emitted to the outside of the display housing 18 through the through-holes 57. The speaker 55 has a pair of lead lines 58. The lead lines 58 are connected to the first surface 38a of second circuit board 38.

As is shown in FIGS. 3 and 4, the projecting portion 30 of display housing 18 has an extension 60. The extension 60 extends away from the support portion 25 and faces an end portion of the LCD 19. A narrow cable passage 61 is defined between the extension 60 and LCD 19. The cable passage 61 communicates with the device containing chamber 31.

The LCD 19 has a rear surface 19b which is opposed to the rear surface 20a of display housing 18. The rear surface 19b has a recess portion 62 in which a connection terminal (not shown) is disposed. The recess portion 62 communicates with the cable passage 61. The LCD 19 is electrically connected to the circuit board 14 over an LCD cable 65. The LCD cable 65 has a first portion 66a and a second portion 66b. The first portion 66a is constructed by arranging many lead lines 66 in parallel, and has a flat shape. The second portion 66b is constructed by bundling together the lead lines 66, and has a bundle shape. The second portion 66b is continuous with the first portion 66a. The first portion 66a of LCD cable 65 is led to the recess portion 19b of LCD 19 via the cable passage 61. The first portion 66a is electrically connected to the connection terminal of LCD 19 by means of a first LCD connector 67. The second portion 66b of LCD cable 65 is contained within the device containing chamber 31. The second portion 66b is held in the device containing chamber 31 by means of a cable holder 68. An end portion of the second portion 66b is guided into the housing body 4 through the support portion 25. This end portion of second portion 66b is electrically connected to the circuit board 14 by means of a second LCD connector 69.

The LCD cable 65, as shown in FIG. 5, has a relay cable 70 branched from the first portion 66a. The relay cable 70 is electrically connected to the first circuit board 33.

When infrared communication is performed between the portable computer 1 having the above structure and another portable computer or a peripheral device, the display unit 3 is at first rotated to the upright position so that the display housing 18 may stand up. In this state, the communication port 47 in the rear surface 20a of display housing 18 is opposed to the communication port of the counterpart portable computer or peripheral device. If the vertical position of the communication port 47 for infrared communication is displaced, such displacement results in communication failure or communication abnormality since infrared, in particular, has high linear propagation properties.

According to the structure of this invention, the infrared communication device 42 is provided in the display unit 3 which can be rotated over about 180°. If the display unit 3 is rotated to vary the angle thereof, the communication port 47 for receiving and emitting infrared moves while describing a locus O1 arcuated upward of the housing body 4, as shown in FIG. 8.

Specifically, when the communication port 47 of portable computer 1 is positioned lower than the communication port of the counterpart device, the display unit 3 is rotated from the upright position toward the closed position. Thereby, the communication port 47 is turned slightly upward relative to the housing body 4, and directly to the communication port of the counterpart device.

On the other hand, when the communication port 47 of portable computer 1 is positioned higher than the communication port of the counterpart device, the display unit 3 is rotated from the upright position toward the fall-back position. Thereby, the communication port 47 is turned slightly downward relative to the housing body 4, and directly to the communication port of the counterpart device. As a result, the light reception element 44 can exactly receive infrared emitted from the communication port of the counterpart device, and the infrared emitted from the light emission element 43 can exactly be guided to the communication port of the counterpart device.

Accordingly, the vertical position of the communication port 47 can be adjusted only by rotating the display unit 3 among the upright position, closed position and fall-back position, and the range of infrared reception/transmission can be widened. Even when the communication port 47 for infrared communication of the portable computer is vertically displaced from the communication port of the counterpart device, there is no need to perform such a time-consuming work as raising the computer, and infrared communication can be performed easily. In addition, the possibility of communication failure or communication abnormality decreases, and the reliability of data exchange by means of infrared increases.

According to the above structure, the rear surface 20a of display housing 18 has the projecting portion 30 projecting away from the front surface 20b, and the projecting portion 30 cooperates with the front surface 20b to constitute the device containing chamber 31. In the region of the device containing chamber 31, the inside space of the display housing 18 in its thickness direction increases and accordingly the drive circuit section 32 of LCD 19 and the second circuit board 38 provided with the LEDs 40 and infrared communication device 42 can be disposed there with no difficulty.

Moreover, the projecting portion 30 is located in a position shifting toward the end portion of the support portion 25 at the rear surface 20a of display housing 18. Thus, most part of the display housing 18 may be formed to have a thickness enough to contain the LCD 19. Besides, the LCD 19 and the first and second circuit boards 33 and 38 are arranged within the space between the rear surface 20a and front surface 20b of display housing 18 such that they do not overlap one another, and accordingly the thickness of the display housing 18 can be reduced as much as possible.

In the above structure, the LCD 19 has the display screen 19a whose horizontal dimension L1 is set at about double the vertical dimension L2 thereof. The LCD 19 itself is elongated in the width direction of the portable computer 1. Thus, the LCD 19 does not greatly extend toward the support portion 25 of display housing 18, and a sufficient space within the device containing chamber 31 can be provided without enlarging the display housing 18. Therefore, the speaker 55 and second circuit board 38 can be contained within the device containing chamber 31 with no difficulty.

In the above-described structure, the infrared communication device 42 and LEDs 40 are commonly supported on the second circuit board 38 in a back-to-back arrangement. Compared to a case where the infrared communication device 42 and LEDs 40 are supported on different circuit boards, the number of parts can be reduced and these infrared communication device 42 and LEDs 40 can be disposed within the device containing chamber with no difficulty.

The functional components to be mounted on the second circuit board are not limited to the LEDs and may be a speaker or a microphone.

The information apparatus according to the present invention is not limited to a portable computer, and this invention is applicable to other apparatuses such as word processors.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information apparatus comprising:
 a main body having an upper surface on which a keyboard is disposed;
 a display unit including a display housing having a front surface and a rear surface located opposite to the front surface, and a display contained in the display housing and having a display screen exposed to the front surface, the display unit being supported on the main body to be rotatable between a closed position where the display unit falls down to cover said keyboard and open position where the display unit stands up to expose the keyboard;
 a circuit board contained within the display housing, the circuit board having a first surface opposed to the rear surface of the display housing and a second surface opposed to the front surface of the display housing;
 a wireless communication device for transmitting and receiving data, said wireless communication device being arranged on the first surface of the circuit board, contained in the display housing and having a communication port exposed on the rear surface of the display housing in a central region with respect to a width direction of the display housing;
 a plurality of icons for displaying operational states of the apparatus, the icons being disposed on the front surface of the display housing in a back-to-back positional relationship with the wireless communication means; and
 a light source for emitting light to the icons, the light source being disposed on the second surface of the circuit board.

2. An information apparatus comprising:
 a main body having an upper surface;
 a display unit including a display housing having a front surface and a rear surface located opposite to the front surface, and a display contained in the display housing and having a display screen exposed to the front surface, the display unit being supported on the main body to be rotatable between a closed position where the display unit falls down to cover said upper surface and an open position where the display unit stands up to expose the upper surface;

a circuit board contained within the display housing, the circuit board having a first surface opposed to the rear surface of the display housing and a second surface opposed to the front surface of the display housing;

a wireless communication device contained in the display housing, the wireless communication device including an emission element for transmitting data, a reception element for receiving the data, and a communication port facing both the emission and reception elements and being exposed on the rear surface of the display housing in a central region with respect to a width direction of the display housing, and the emission element and the reception element being mounted on the first surface of the circuit board;

icons for displaying operational states of the apparatus, the icons being disposed on the front surface of the display housing; and a light source for emitting light to the icons, the light source being disposed on the second surface of the circuit board.

3. An information apparatus comprising:

a main body having an upper surface on which a keyboard is disposed;

a display unit, the display unit including a display housing provided with a front surface having a second opening portion, and a rear surface having a first opening portion and being located opposite of the front surface, and a display contained in the display housing and having a display screen exposed to the front surface, the display unit being supported on the main body to be rotatable between a closed position where the display unit falls down to cover said keyboard and an open position where the display unit stands up to expose the keyboard;

a circuit board contained within the display housing, the circuit board having a first surface opposed to the rear surface of the display housing and a second surface opposed to the front surface of the display housing;

a wireless communication device for transmitting and receiving data, the wireless communication device being arranged on the first surface of the circuit board and having a communication port exposed on the rear surface of the display housing through the first opening portion in a central region with respect to a width direction of the display housing;

an icon panel for displaying operational states of the apparatus, the icon panel covering the second opening portion of the display housing and being located on the front surface of the display housing; and a light source for emitting light to the icon, the light source being disposed on the second surface of the circuit board.

* * * * *